US011006265B2

(12) United States Patent
Sambe

(10) Patent No.: US 11,006,265 B2
(45) Date of Patent: May 11, 2021

(54) COMMUNICATION APPARATUS, METHOD OF CONTROLLING COMMUNICATION APPARATUS, AND NON-TRANSITORY COMPUTER-READABLE STORAGE MEDIUM

(71) Applicant: CANON KABUSHIKI KAISHA, Tokyo (JP)

(72) Inventor: Hideo Sambe, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 16/427,522

(22) Filed: May 31, 2019

(65) Prior Publication Data

US 2019/0380022 A1 Dec. 12, 2019

(30) Foreign Application Priority Data

Jun. 11, 2018 (JP) .............................. JP2018-111244

(51) Int. Cl.
*H04W 8/00* (2009.01)
*H04L 29/08* (2006.01)
*H04N 1/00* (2006.01)

(52) U.S. Cl.
CPC ............ *H04W 8/005* (2013.01); *H04L 67/22* (2013.01); *H04N 1/0097* (2013.01); *H04N 1/00315* (2013.01)

(58) Field of Classification Search
CPC .......... H04W 8/005; H04W 84/18–22; H04W 4/70–80; H04W 48/16–20
See application file for complete search history.

(56) References Cited

U.S. PATENT DOCUMENTS

| 2015/0319675 | A1* | 11/2015 | Park | H04W 40/244 370/338 |
| 2016/0241433 | A1* | 8/2016 | Huang | H04W 48/16 |
| 2017/0086154 | A1* | 3/2017 | Sawada | H04W 48/16 |
| 2018/0027487 | A1* | 1/2018 | Pang | H04L 67/16 370/338 |
| 2018/0124785 | A1* | 5/2018 | Taylor | H04L 67/12 |

FOREIGN PATENT DOCUMENTS

JP 2017063309 A 3/2017

* cited by examiner

Primary Examiner — Marcus Smith
(74) Attorney, Agent, or Firm — Carter, Deluca & Farrell LLP

(57) ABSTRACT

A communication apparatus capable of communication with another communication apparatus inside a NAN (Neighbor Awareness Networking) cluster in a network compliant with a NAN standard, holds a use history of a service previously used by the communication apparatus, determines, in a case where the communication apparatus uses a service, whether a use history of the service is being held, and if it is determined that a use history of the service is being held, performs a search for the service without performing processing to detect a NAN cluster, and, if it is determined that a use history of the service is not being held, performs processing to detect a NAN cluster and search for the service after detecting the NAN cluster.

13 Claims, 11 Drawing Sheets

FIG. 11

| | PRINTER NAN INFORMATION (1101) | | | | | | POSITION INFORMATION (1102) | SERVICE DETAILS (1103) |
|---|---|---|---|---|---|---|---|---|
| | NAN CLUSTER ID | DW TIMING | Publish ID (Instance ID) | Service ID | MAC ADDRESS (Transmitter Address) | Service Info | | |
| DATA UPDATE TIMING | CLUSTER SEARCH TIME | CLUSTER SEARCH TIME | SERVICE SEARCH TIME IN CLUSTER | SERVICE SEARCH TIME IN CLUSTER | SERVICE SEARCH TIME IN CLUSTER | SERVICE SEARCH TIME IN CLUSTER | TIME OF SERVICE USE | TIME OF SERVICE USE |
| DATA OBTAINMENT SOURCE | Discovery Beacon | VALUE CALCULATED FROM Sync Beacon | Publish | Publish | Publish | Publish | OWN DEVICE | OWN DEVICE |
| USE HISTORY 1 (DATE AND TIME) | 50-6F-9A-01-00-01 | RELATIVE TIME IN CLOCK CYCLE FOR TIME OF RECEIPT OF NAN Sync Beacon | 1 | HASH VALUE GENERATED FROM SERVICE NAME | 01-23-45-67-89-AA | PRINTER NAME "OFFICE A 5TH FLOOR PRINTER" | LATITUDE A, LONGITUDE A, ALTITUDE A | PRINTING |
| USE HISTORY 2 (DATE AND TIME) | 50-6F-9A-01-00-02 | RELATIVE TIME IN CLOCK CYCLE FOR TIME OF RECEIPT OF NAN Sync Beacon | 2 | HASH VALUE GENERATED FROM SERVICE NAME | 01-23-45-67-89-BB | PRINTER NAME "OFFICE B 5TH FLOOR PRINTER" | LATITUDE B, LONGITUDE B, ALTITUDE B | PRINTING |
| USE HISTORY 3 (DATE AND TIME) | 50-6F-9A-01-00-03 | RELATIVE TIME IN CLOCK CYCLE FOR TIME OF RECEIPT OF NAN Sync Beacon | 3 | HASH VALUE GENERATED FROM SERVICE NAME | 01-23-45-67-89-CC | PRINTER NAME "OFFICE C 4TH FLOOR PRINTER" | LATITUDE C, LONGITUDE C, ALTITUDE C | PRINTING |
| ... | ... | ... | ... | ... | ... | ... | ... | ... |

FIG. 12

| NEIGHBORING PRINT SERVICES | |
|---|---|
| MAC ADDRESS | SERVICE INFORMATION |
| 50-6F-9A-01-00-01 | OFFICE A 5TH FLOOR PRINTER |
| 50-6F-9A-01-00-02 | OFFICE B 5TH FLOOR PRINTER |

COMMUNICATION APPARATUS, METHOD OF CONTROLLING COMMUNICATION APPARATUS, AND NON-TRANSITORY COMPUTER-READABLE STORAGE MEDIUM

BACKGROUND OF THE INVENTION

Field of the Invention

The present invention relates to a communication apparatus that performs a wireless connection, a method of controlling a communication apparatus, and a non-transitory computer-readable storage medium.

Description of the Related Art

In recent years, wireless LAN systems compliant with IEEE 802.11 have been widely used. Accompanying this, a technique in which a wireless LAN terminal, while saving power, easily discovers a wireless LAN application or information that is obtained in accordance with communication has been proposed. Japanese Patent Laid-Open No. 2017-063309 describes a Neighbor Awareness Networking (hereinafter referred to as NAN) standard, defined by The Wi-Fi Alliance, for a wireless LAN terminal to discover a usable service or information before connecting to a neighboring wireless LAN terminal.

In NAN, a cluster (hereinafter referred to as a NAN cluster) is formed between a plurality of terminals. A terminal that joins a NAN cluster transmits and receives signals for, in a Discovery Window (DW) which is a periodic time period, sharing a signal for indicating a DW time period (hereinafter referred to as a sync beacon), application information, or the like. The DW is a time period in which a terminal that has joined the NAN cluster can share the presence of the terminal or information relating to a service or application. A terminal that provides a service or application (a service provision apparatus) transmits a service provision signal in this DW time period. A terminal searching for a service or an application transmits a service request signal in this DW time period. In addition, upon detecting a plurality of NAN clusters, the terminal can select a NAN cluster to join based on a Cluster Grade of each NAN cluster. The Cluster Grade of each NAN cluster is calculated based on a Master preference of a terminal that operates as an Anchor Master for determining DW timings in each NAN cluster. The Master preference indicates how likely it is for the terminal to become a Master.

In a conventional technique, a terminal in a NAN cluster, even in a case of attempting to receive a service that is the same as a service used previously from the service provision apparatus that provides the service, must perform processing to discover the NAN cluster. In other words, it was necessary to perform processing of the following three steps 1 to 3: step 1—search for a NAN cluster and join the NAN cluster (Discovery Beacon/Sync Beacon); step 2—search for a target service provision apparatus (Subscribe/Publish); and step 3—connect to the desired service provision apparatus (Follow-up), and so there was redundant processing.

SUMMARY OF THE INVENTION

In consideration of the foregoing problem, the present disclosure provides a technique for simplifying a connection procedure for a case of reusing the same service from the same apparatus as used before.

According to one aspect of the present invention, there is provided a communication apparatus capable of communication with another communication apparatus inside a NAN (Neighbor Awareness Networking) cluster in a network compliant with a NAN standard, the apparatus comprises: a holding unit configured to hold a use history of a service previously used by the communication apparatus; a determination unit configured to, in a case where the communication apparatus uses a service, determine whether a use history of the service is being held by the holding unit; and a processing unit configured to, if it is determined by the determination unit that a use history of the service is being held, perform a search for the service without performing processing to detect a NAN cluster, and, if it is determined by the determination unit that a use history of the service is not being held, perform processing to detect a NAN cluster and search for the service after detecting the NAN cluster.

Further features of the present invention will become apparent from the following description of exemplary embodiments (with reference to the attached drawings).

BRIEF DESCRIPTION OF THE DRAWINGS

FIG. 11 is a view illustrating an example of service use history information.

FIG. 12 is a view illustrating an example of a screen for accepting a printer service selection operation.

DESCRIPTION OF THE EMBODIMENTS

Explanation is given below in detail, with reference to the drawings, of embodiments of the present invention as examples. However, display screens, relative arrangements of configuration elements, and the like that are recited in the present embodiment are not particularly intended to limit the scope of the invention thereto, unless specifically stated.

<System Configuration>

Figure 1:
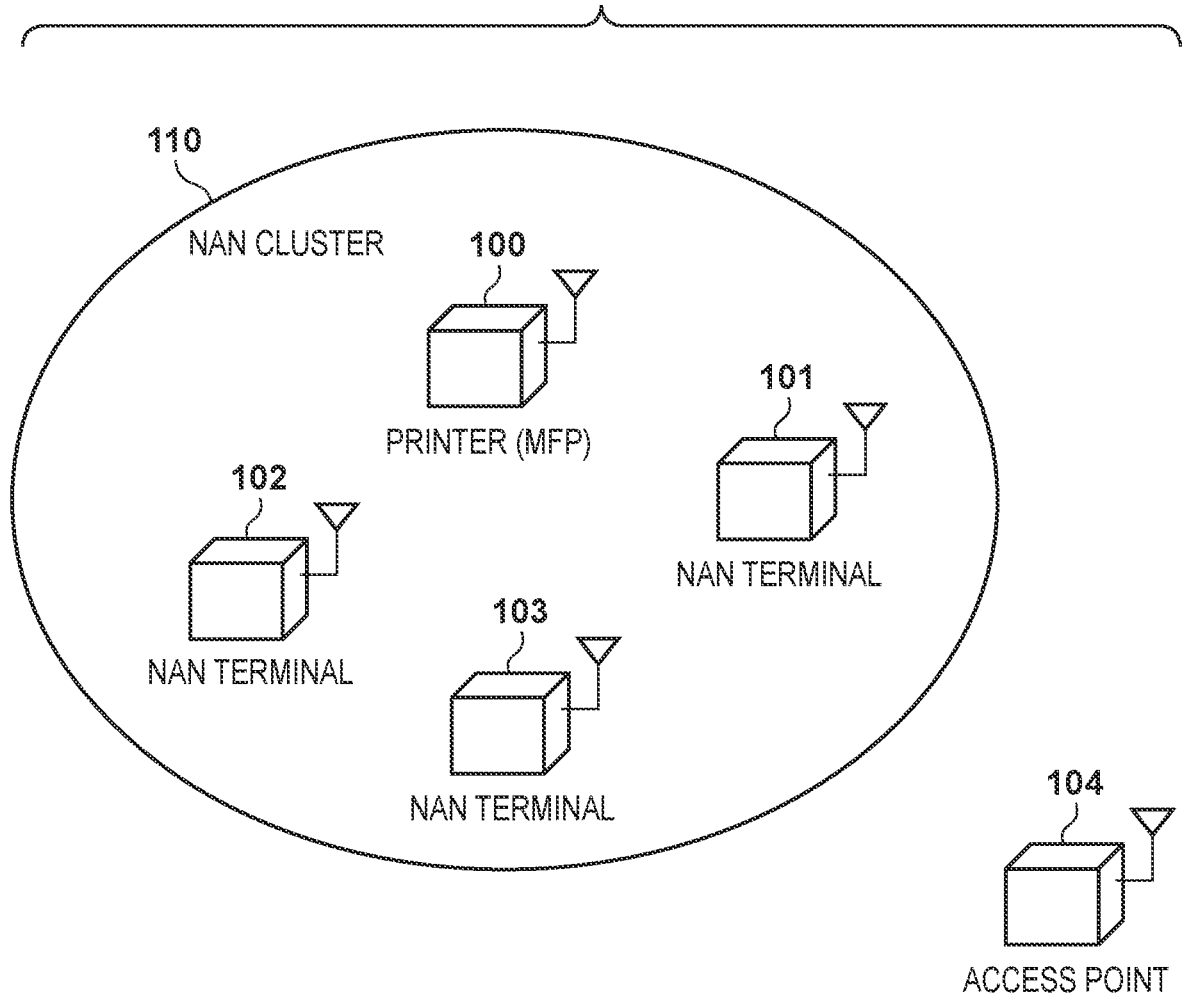
FIG. 1 is a view illustrating an example of a configuration of a wireless communication system.

Firstly, description using FIG. 1 to FIG. 5 is given regarding a system configuration for realizing each embodiment described below. FIG. 1 is a view illustrating an example of a configuration of a wireless communication system in the present embodiment. Each wireless communication system includes a printer (a Multi Function Printer (MFP)) 100, NAN (Neighbor Awareness Networking) terminals 101 to 103, and an access point 104. The printer 100 and the NAN terminals 101 to 103 belong to a NAN cluster 110. Note that the apparatuses illustrated in FIG. 1 are examples of communication apparatuses in the present embodiment. In the present embodiment, the printer 100 and the NAN terminals 101 to 103 are all compliant with an IEEE 802.11 standard series, and are assumed to have a NAN communication function with low power consumption, and a wireless LAN communication function that has relatively higher power consumption than the NAN communication function.

The NAN terminals 101 to 103 are communication apparatuses that have a NAN communication function and a wireless LAN communication function. The NAN terminal 101 detects the printer 100 in accordance with a NAN specification, and can use a wireless LAN to transmit print data to the detected printer 100. Communication in NAN is intermittent communication in accordance with a Discovery Window (DW) for a predetermined short time period at a predetermined cycle being set, and thus it is possible to keep power consumption low. In addition, communication in NAN is compliant with the IEEE 802.11 standard series, and can be executed using a communication circuit for wireless LAN communication that is compliant with the IEEE 802.11 standard series. Accordingly, it is possible to keep the cost of the communication apparatus low in comparison to a case where communication that cannot share a communication circuit, such as BLE (Bluetooth (registered trademark) Low Energy), is used. In the present embodiment, the NAN terminal 101 is a smart phone. A smart phone a multifunction portable telephone equipped with camera, Web browser, and electronic mail functions, or the like, in addition to a portable telephone function. Note that the NAN terminal 101 may also be a personal information terminal such as a PDA (Personal Digital Assistant), a portable telephone, a digital camera, or the like.

The printer 100 has a NAN communication function and a wireless LAN communication function, and is configured to be able to connect to the NAN terminal 101. The printer 100 may have a reading function (scanner), a FAX function, and a telephone function and not just a print function.

The access point 104 has a wireless LAN communication function compliant with the IEEE 802.11 standard series, and can provide infrastructure mode communication by relaying communication between apparatuses permitted to connect to the access point 104. The printer 100 and the NAN terminal 101 may perform infrastructure mode wireless communication via the access point 104, and may perform wireless communication in accordance with a P2P (Peer to Peer) connection such as Wi-Fi Direct. Note that the printer 100 and the NAN terminal 101 can execute processing corresponding to a plurality of print services via the wireless LAN.

Note that each apparatus illustrated in FIG. 1 may have a wireless communication function in accordance with a wireless communication standard other than the IEEE 802.11 standard series. In other words, it is possible to apply the following discussion in the case of a communication apparatus that supports a plurality of wireless communication methods that can share wireless communication hardware, where at least one of the plurality of wireless communication methods is a wireless communication method that has low power consumption.

Figure 2:
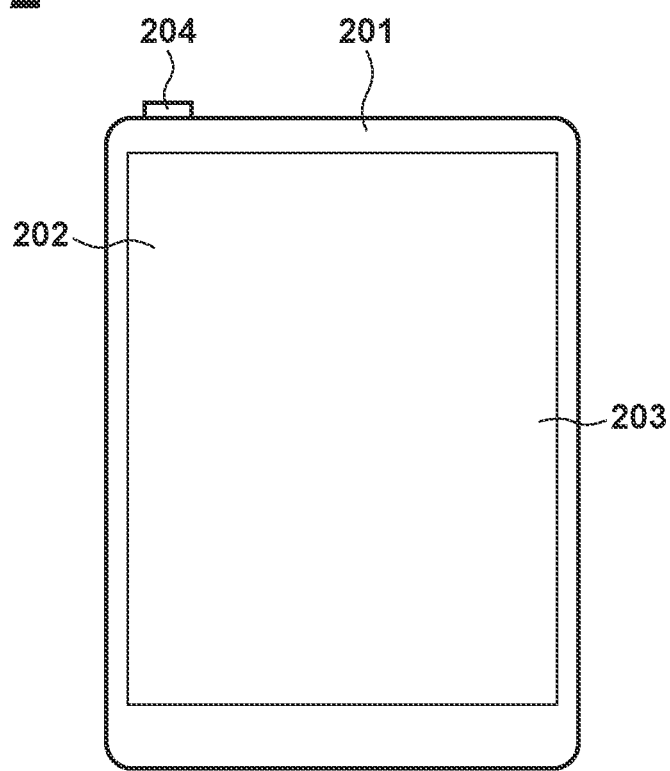
FIG. 2 is a view illustrating an outer appearance of a NAN terminal 101.

FIG. 2 is a view illustrating an outer appearance of the NAN terminal 101 of FIG. 1. As described above, in the present embodiment, the NAN terminal 101 is assumed to be a smart phone. The NAN terminal 101 in the present embodiment has a wireless LAN unit 201, a display unit 202, an operation unit 203, and a power supply key 204.

The wireless LAN unit 201 has a data (packet) communication function for a wireless LAN system compliant with the IEEE 802.11 series, for example (a wireless LAN communication function). In wireless communication using the wireless LAN unit 201, communication based on Wi-Fi Direct, communication in accordance with a software AP (Access Point) mode or an infrastructure mode, or the like are possible. In addition, the wireless LAN unit 201 has a NAN communication function. The display unit 202 is a display provided with an LCD (liquid crystal display) display mechanism, for example. The operation unit 203 is equipped with a touch panel type operation mechanism and detects an operation by a user. There is a representative operation method where the display unit 202 displays a button icon or a software keyboard, and an operation event is detected by a user making contact with a location thereof. A power supply key 204 is a hard key used when a power supply is turned on and off.

Figure 3:
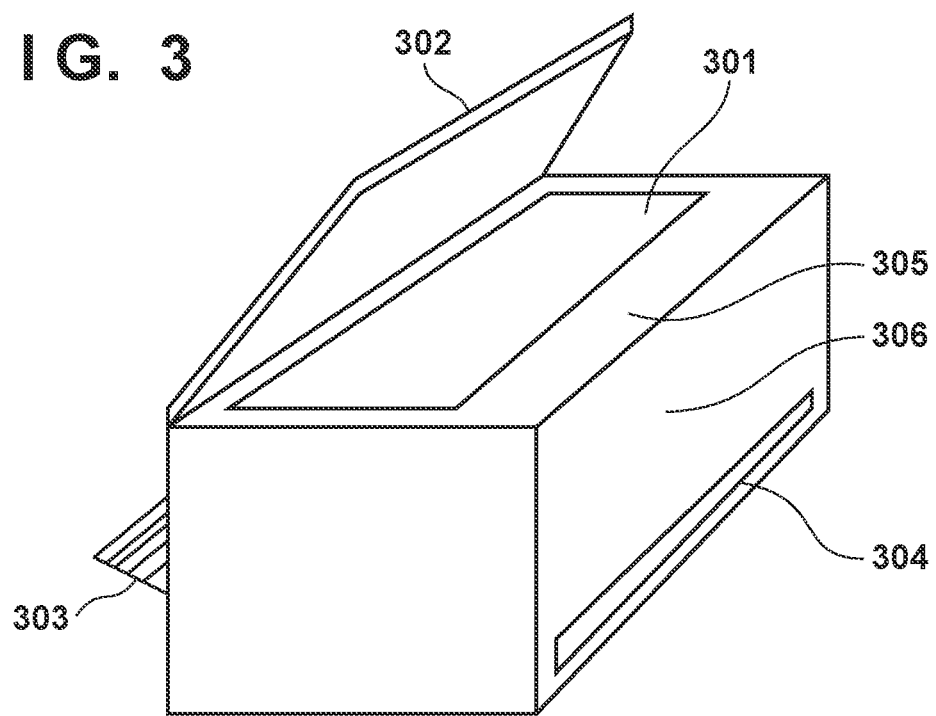
FIG. 3 is a view illustrating an outer appearance of a printer (MFP) 100.

FIG. 3 is a view illustrating an outer appearance of the printer 100. The printer 100 in the present embodiment has an original platen 301, an original lid 302, a printing sheet insertion port 303, a printing sheet discharging port 304, an operation display unit 305, and a wireless LAN antenna 306.

The original platen 301 is a transparent glass stand for placing an original to be read by a scanner (the read unit). The original lid 302 is a lid for pressing an original when reading by a scanner is performed, and for configuring so that a light from a light source irradiating the original when reading does not leak outside. The printing sheet insertion port 303 is an insertion port into which various sizes of sheets can be set. Sheets set into the printing sheet insertion port 303 are conveyed to the print unit one at a time, and are discharged from the printing sheet discharging port 304 after printing is performed by the print unit. The operation display unit 305 is configured by keys such as a character input key, a cursor key, a deciding key, or a cancel key, an LED (a light emitting diode), an LCD, or the like, and the operation display unit 305 enables the user to perform various settings or activate of various functions of the printer 100. In addition, it may be configured by the touch panel. The wireless LAN antenna 306 is embedded with an antenna for communicating by the wireless LAN.

Figure 4A:
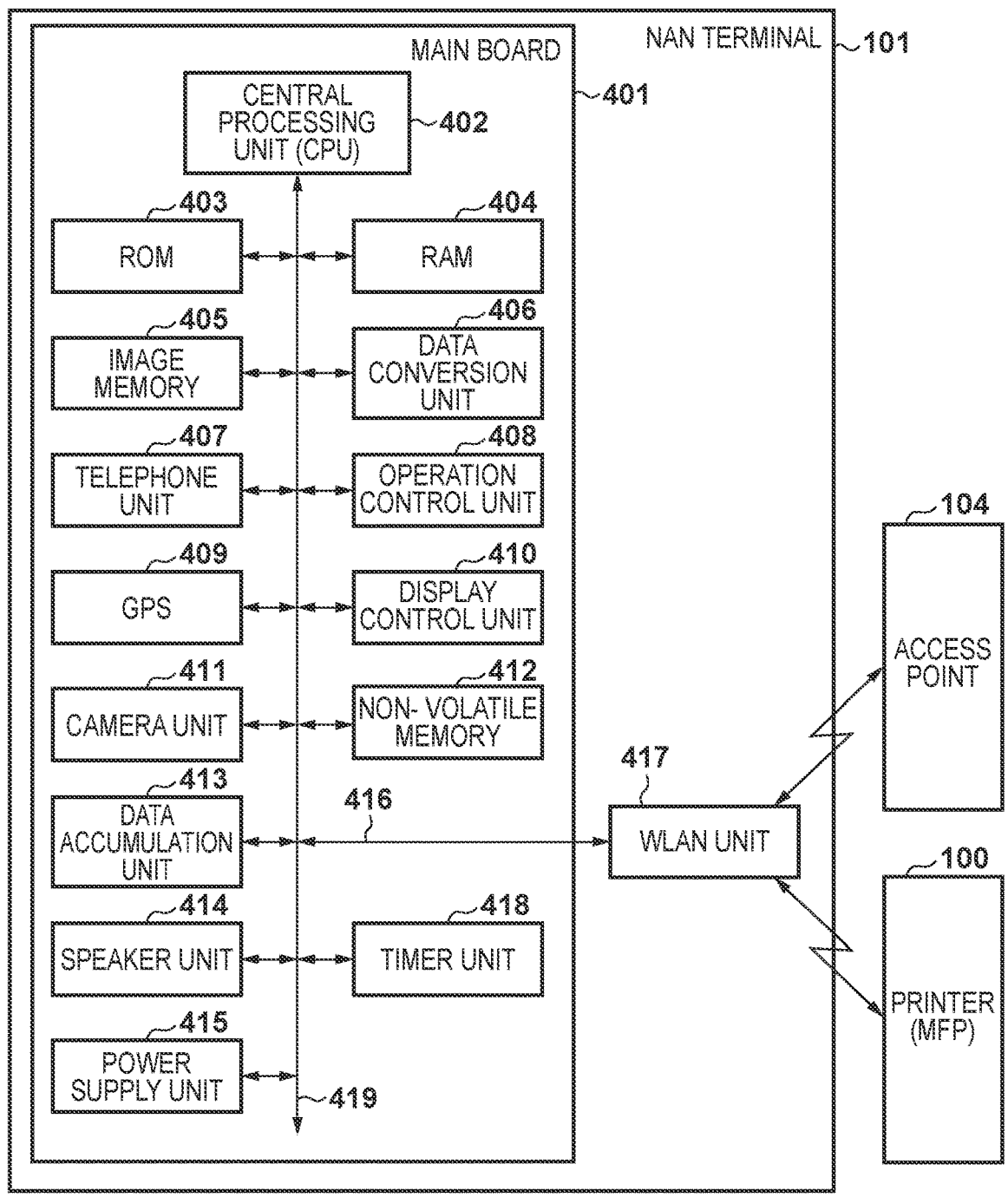
FIG. 4A is a view illustrating an internal configuration of the NAN terminal 101.

FIG. 4A is a block diagram that illustrates an internal configuration of the NAN terminal 101. The NAN terminal 101 has a main board 401 for performing main control, and a wireless LAN (WLAN) unit 417 for performing wireless LAN communication. In the main board 401, a CPU (central processing unit) 402 is a system control unit and controls the entirety of the NAN terminal 101. The CPU 402 is configured by one or a plurality of CPUs. Processing of the NAN terminal 101 described below is executed in accordance with control by the CPU 402. A ROM 403 stores a control program executed by the CPU 402, an embedded operating system (OS) program, and the like. In the present embodiment, each control program stored in the ROM 403 performs software control such as scheduling or task switching under the management of the embedded OS stored in the ROM 403. The RAM 404 is configured by DRAM (Dynamic RAM), SRAM (Static RAM) or the like, stores data such as a program control variable, stores data such as a setting value registered by a user or management data or the NAN terminal 101, and provides various work buffer regions. An image memory 405 is configured by memory such as DRAM, and temporarily stores image data received via the wireless LAN unit 417 or image data read from a data storage unit 413 in order for it to be processed by the CPU 402. A non-volatile memory 412 is configured by a memory such as a flash memory, and continues to store data even if a power supply is turned off. Note that there is no limitation to these memory configurations. For example, the image memory 405 and the RAM 404 may be shared, and data may be backed up to the data storage unit 413. In addition, in the present embodiment, DRAM is used for the image memory 405, but there is no limitation to this as another storage medium such as a hard disk or a non-volatile memory may be used.

A data conversion unit 406 performs analysis of data of various formats, or data conversion such as color conversion or image conversion. A telephone unit 407 realizes communication by telephone by performing control of a telephone line, and processing audio data inputted and outputted via a speaker unit 414. A console control unit 408 converts an operation detected by the operation unit 203 (FIG. 2) into a signal, and conveys the signal to each configuration element in the main board 401. A GPS unit (Global Positioning System) 409 obtains position information such as a present latitude and longitude of the NAN terminal 101, the position information is processed by the CPU 402, and information after the processing is saved in the RAM 404 or displayed on the display unit 202 (FIG. 2). A display control unit 410 electronically controls display content of the display unit 202 (FIG. 2), and enables various input operations, display of an operating condition or a status of the printer 100 to be displayed, for example. A camera unit 411 has a function for electrically storing and encoding an image input via a lens. An image captured by the camera unit 411 is saved in the data storage unit 413. The speaker unit 414 realizes a function for inputting or outputting audio for a telephone function and also a function such as an alarm notification. A power supply unit 415 is a portable battery, and performs power supply control with respect to the inside of the apparatus. Power supply states include a battery exhausted state where there is no remaining amount in the battery, a powered off state in which the power supply key 205 has not been pressed, an activated state where the apparatus has been normally activated, and a power saving state in which power saving is activated. A timer unit 418 performs timekeeping. The various configuration elements inside the main board 401 are connected to each other via a system bus 419 managed by the CPU 402.

The wireless LAN unit 417 is connected to the main board 401 via a bus cable 416. The wireless LAN unit 417 is for realizing communication compliant with a standard. The wireless LAN unit 417 converts data to be transmitted to a packet, and performs packet transmission with respect to another apparatus, for example. In addition, the wireless LAN unit 417 receives a packet from another apparatus, returns the received packet to original data, and transmits that to the CPU 402.

Figure 4B:
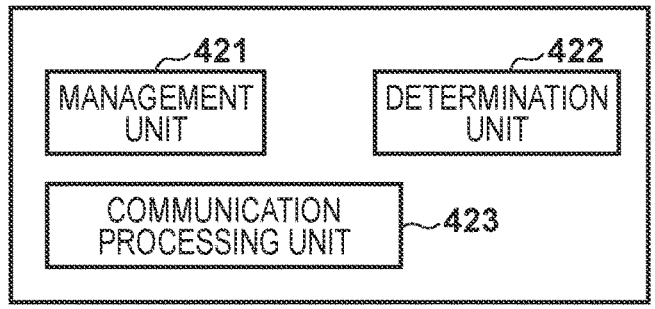
FIG. 4B is a view illustrating a function module of the NAN terminal 101.

FIG. 4B is a block diagram illustrating a function module of the NAN terminal 101. A management unit 421 manages (registers, updates, or the like) and holds service use history information, which is described later. If the NAN terminal 101 uses a desired service in accordance with a user operation, a determination unit 422 determines whether a use history of the desired service has been registered in the service use history information. A communication processing unit 423 executes processing relating to NAN communication via the wireless LAN unit 417. Each function module of FIG. 4B may be implemented in accordance with software, or may be implemented in accordance with dedicated hardware such as an ASIC (Application Specific Integrated Circuit). In the case of implementation by software, a program comprising instructions for realizing a function of a respective function module is stored in the ROM 403 or the like, and the CPU 402 executes this program to thereby realize this function.

Figure 5:
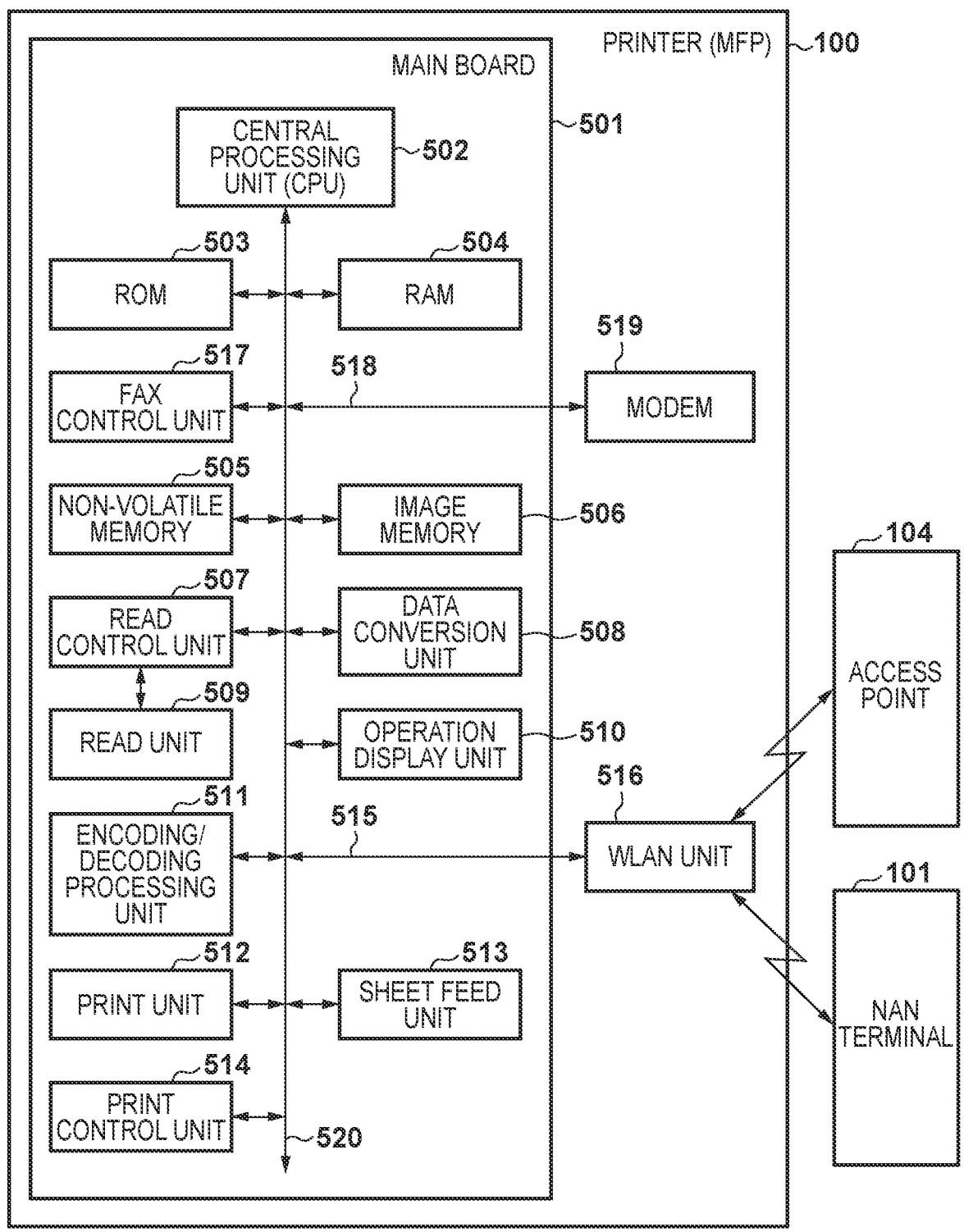
FIG. 5 is a block diagram illustrating the internal configuration of a printer (MFP) 100.

FIG. 5 is a block diagram illustrating the internal configuration of the printer 100. The printer 100 has a main board 501 for performing main control, and a wireless LAN unit 516 for performing wireless LAN communication. In the main board 501, a CPU (central processing unit) 502 is a system control unit and controls the entirety of the printer 100. Processing of the printer 100 described below is executed in accordance with control by a CPU 502. A ROM 503 stores a control program executed by the CPU 502, an embedded operating system (OS) program, and the like. In the present embodiment, each control program stored in the ROM 503 performs software control such as scheduling or task switching under the management of the embedded OS stored in the ROM 503. A RAM 504 is configured by SRAM or the like, stores data such as a program control variable, stores data such as a setting value registered by a user or management data of the printer 100, and provides various work buffer regions. A non-volatile memory 505 is configured by a memory such as a flash memory, and continues to store data even if a power supply is turned off. An image memory 506 is configured by a memory that is DRAM or the like, and stores image data received via the wireless LAN unit, image data processed by an encoding/decoding processing unit 511, or the like. As with the memory configuration for the NAN terminal 101, there is no limitation to such a memory configuration. A data conversion unit 508 performs analysis of data of various formats, or a conversion from image data to print data. A read control unit 507 controls a read unit 509 (for example, a CIS image sensor (a contact image sensor)) to optically read an image on an original. Next, an image signal, which is a result of converting this image to electrical image data, is outputted. At this point, various image processing such as binarization processing and halftone processing may be performed before outputting.

An operation display unit 510 corresponds to the operation display unit 305 on FIG. 3. The encoding/decoding processing unit 511 performs enlargement/reduction processing, or encoding/decoding processing for image data handled by the printer 100 (JPEG, PNG, or the like). A sheet feed unit 513 holds sheets for printing. A print control unit 514 can perform feeding of a sheet from the sheet feed unit 513. In particular, the sheet feed unit 513 can prepare a plurality of sheet feed units in order to hold a plurality of types of sheets in one apparatus. The print control unit 514 can control from which sheet feed unit to perform feeding. The print control unit 514 outputs to a print unit 512 after performing various image processing such as smoothing processing, print density correction processing, or color correction on image data to be printed. The print unit 512 can employ an ink-jet printer for printing an image by causing ink supplied from an ink tank to be discharged from a printhead, for example. In addition, the print control unit 514 fulfills a role of periodically reading information of the print unit 512 and updating information of the RAM 504. Information of the print unit 512 is status information such as a remaining amount of the ink tank or a state of the printhead, for example. The various configuration elements inside the main board 501 are connected to each other via a system bus 520 managed by the CPU 502.

As with the NAN terminal 101, the wireless LAN unit 516 is implemented in the printer 100, and because its function is equivalent to that of the wireless LAN unit 417 in the NAN terminal 101, description thereof is omitted. The wireless LAN unit 516 is connected to the main board 501 via a bus cable 515. Note that the NAN terminal 101 and the printer 100 are capable of communication in accordance with Wi-Fi Direct, and have a software access point (software AP) function. If either of the NAN terminal 101 and the printer 100 operates as Group Owner in Wi-Fi Direct, they construct a wireless network by activating the software AP.

<NAN Operation>

Figure 6:
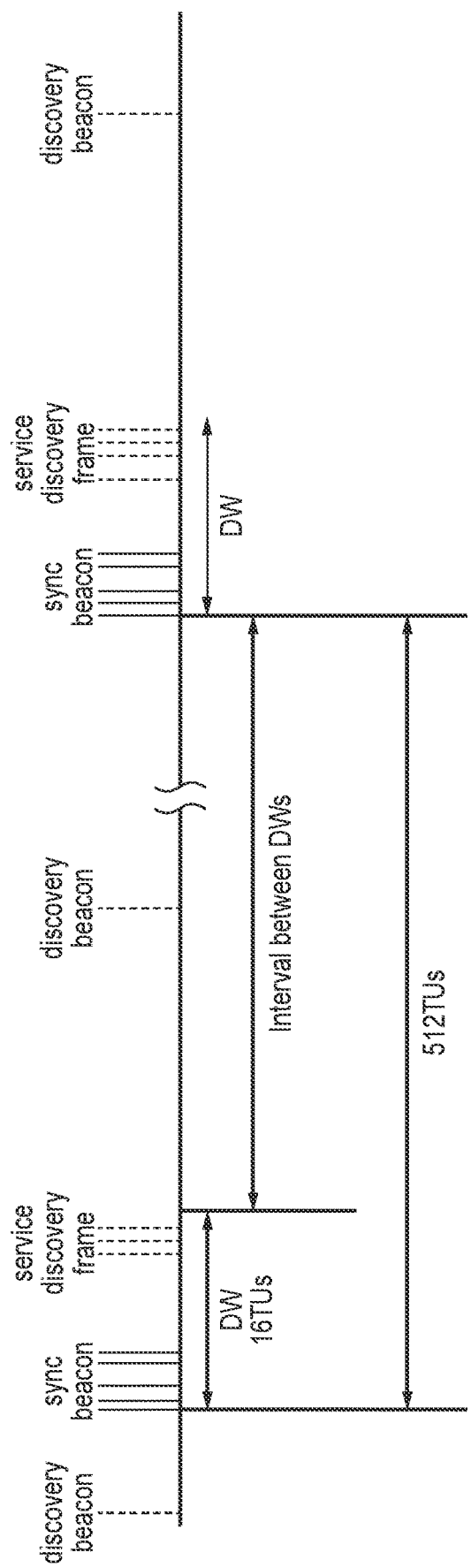
FIG. 6 is a view illustrating signals transmitted in a NAN DW (Discovery Window).
Figure 7:
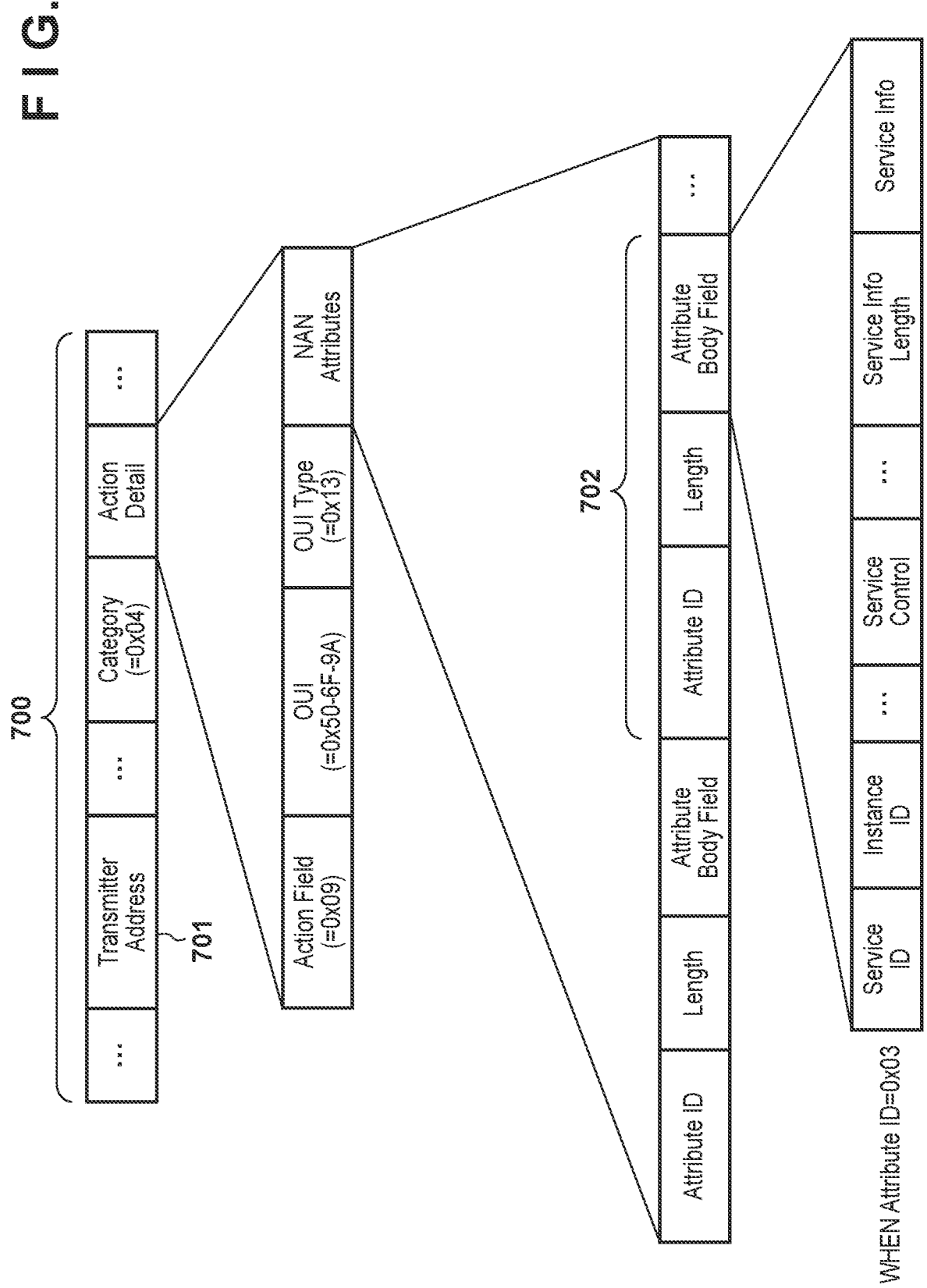
FIG. 7 is a view illustrating a frame configuration of a NAN SDF (Service Discovery Frame).

NAN operation for realizing the present embodiment is described using FIG. 1, FIG. 6, and FIG. 7 in accordance with a NAN specification. FIG. 6 is a view illustrating signals transmitted in a NAN DW (Discovery Window). In the present embodiment, it is assumed that the NAN terminal 101 performs communication for searching for a printer by NAN which has low power consumption, and performs communication for transmitting print data by a wireless LAN which is high-speed and has relatively larger power consumption. NAN communication between the NAN terminal 101 and the printer 100 which is the search target is executed as bidirectional communication in a DW set as a time period of a predetermined length that periodically arrives on Channel 6 (2.437 GHz) in a 2.4 GHz frequency band. Note that a set of communication apparatuses sharing a DW schedule is referred to as a NAN cluster. A DW is set as a time period of 16 TU every 512 TU. Note that "TU" is an acronym for Time Unit, and one TU is 1024 microseconds. In the present embodiment, the NAN terminal 101 and the printer 100 belong to the same NAN cluster 110, and by this, the NAN terminal 101 can perform communication with the printer 100 in the DW time period.

The NAN cluster includes an apparatus that operates as Master which is a role for repeatedly transmitting a Discovery Beacon which is a signal for allowing a terminal that does not belong to the NAN cluster to recognize the NAN cluster. The Discovery Beacon (a discovery signal) is transmitted at a timing of every 100 ms, outside of the DW time periods, for example. In addition, the apparatus that operates as Master transmits, inside the DW time period, a Synchronization Beacon (a synchronization signal) (hereinafter referred to as Sync Beacon) which is a beacon for each terminal to identify and synchronize with the DW. In addition, in addition to Master, roles such as Non-Master Sync and Non-Master Non-Sync are defined in NAN. Non-Master Sync is a role that does not transmit a Discovery Beacon but transmits a Sync Beacon. Non-Master Non-Sync is a role for not transmitting Discovery Beacons or Sync Beacons. A NAN terminal that belongs to a NAN cluster operates as one of these three types of roles.

In the present embodiment, it is assumed that the printer 100 operates as Master of the NAN cluster 110. The NAN terminal 101 can receive a Discovery Beacon from the printer 100 to thereby recognize the NAN cluster 110, and further receive a Sync Beacon to thereby detect the DW time period of the NAN cluster 110 (share the DW schedule).

Note that change of an apparatus that operates as Master within a NAN cluster is permitted. In addition, the NAN cluster 110 may be configured by the NAN terminal 101 transmitting a Discovery Beacon as Master and the printer 100, which is present nearby, receiving the Discovery Beacon. In addition, configuration may be taken such that the NAN terminal 102 operates as Master, and the printer 100 and the NAN terminal 101 receive a Discovery Beacon transmitted from the NAN terminal 102 and join the NAN cluster 110.

The NAN terminal 101 and the printer 100 can communicate within the NAN cluster 110, and transmit and receive information related to the presence or absence of a print service within a DW time period of the NAN cluster 110. The NAN terminal 101 transmits, within a DW time period, a Subscribe message which is a message for detecting or requesting a service to thereby notify that it is searching for an apparatus that is providing a print service. In response to this, the printer 100 transmits, within a DW time period, a Publish message which is a message for notifying that it is providing a print service. The NAN terminal 101 and the printer 100 may also transmit and receive additional information in accordance with a follow-up message. Messages such as Publish, Subscribe, and Follow-up are transmitted in a frame format referred to as Service Discovery Frame (SDF) (description by FIG. 7 is given regarding the SDF frame format). Note that, when searching for an apparatus that is providing another service that is not a print service, the NAN terminal 101 transmits a Subscribe message which designates the other service. In response to that, an apparatus that is providing this other service transmits a Publish message indicating that it is providing the service.

FIG. 7 is a view illustrating a frame configuration of a NAN SDF (Service Discovery Frame). An SDF 700 is a type of a MAC frame defined in the IEEE 802.11 standard series, and includes Transmitter Address 701 which is an address of a NAN terminal (a NAN device) that is a transmission source, and one or more the NAN Attributes 702. The Transmitter Address 701 is assumed to be a MAC address in the present embodiment. Note that the Transmitter Address 701 is referred to as TA below. There are a plurality of types of NAN attributes. The type is defined by an attribute ID, and the contents of an attribute body field are defined for each type. When the value of the attribute ID is 0x03, the NAN attribute is called a Service Descriptor Attribute. The attribute body field of a Service Descriptor Attribute includes the respective fields of a Service ID, Service Control, and Service Info. A Service ID field can include information representing a type of a service, such as a print service. A Service Control field can include information representing the message type such as Publish, Subscribe, and Follow-up. A Service Info field can include any information, such as information that enables a printer to be identified. In addition, a NAN Attribute for sending other information may be defined.

Upon receiving, within a DW time period, a publish message indicating that a print service is being provided from the printer 100, the NAN terminal 101 establishes a wireless LAN connection, which is separate to NAN, with the printer 100. For example, the printer 100 operates as a wireless LAN access point (AP), and the NAN terminal 101 can connect to the printer 100 by operating as a wireless LAN station (STA). Note that configuration may be taken such that the printer 100 operates as a STA and the NAN terminal 101 operates as the AP, or the NAN terminal 101 and the printer 100 both operate as a STA to connect to the AP 104 which is an external unit. Furthermore, the NAN terminal 101 and the printer 100 may make a P2P connection (a direct connection) based on a Wi-Fi Direct standard. Establishing a wireless connection for data communication in a network separate to NAN after discovering a connection counterpart by NAN in this way is referred to as Post NAN in a NAN standard. The NAN terminal 101 uses a Post NAN wireless connection to transfer print data to the printer 100. Note that the NAN terminal 101 and the printer 100 may be configured to exchange timing information in accordance with communication within a NAN DW time period, and communicate print data in any period based on the exchanged timing information, in other words inside a DW time period and/or outside DW time periods. In other words, the NAN terminal 101 may transmit print data using communication in accordance with NAN instead of transmitting print data using a Post NAN wireless connection. This communication is referred to as NAN Data Link in the NAN standard. For a frequency channel used in such a case, a channel used in DW communication (for example, 6 ch) may continue to be used, and a different channel may be used. If a different channel is used, it is possible to suppress an influence due to signal interference even if a communication period for print data partially overlaps with a DW.

In a case of using Post NAN for transmission of print data, the NAN terminal 101 and the printer 100 use SDFs to exchange information necessary to establish a wireless connection by Post NAN, based on the NAN standard. For example, if the printer 100 operates as a wireless LAN AP, the printer 100 includes a WLAN Infrastructure Attribute, which is a type of NAN Attribute, in an SDF. The printer 100 then transmits an SDF that includes a BSSID (Basic Service Set Identifier) in an Attribute Body Field thereof. Having received the SDF, the NAN terminal 101 uses information included in the SDF to establish a wireless LAN connection. Note that the BSSID may be included in Service Info inside a Service Descriptor Attribute, which is another type of NAN Attribute. In addition, connection setting information, other than the BSSID, that is necessary to establish a wireless connection may be exchanged by an SDF based on the NAN standard.

<Processing Flow>

Figure 8:
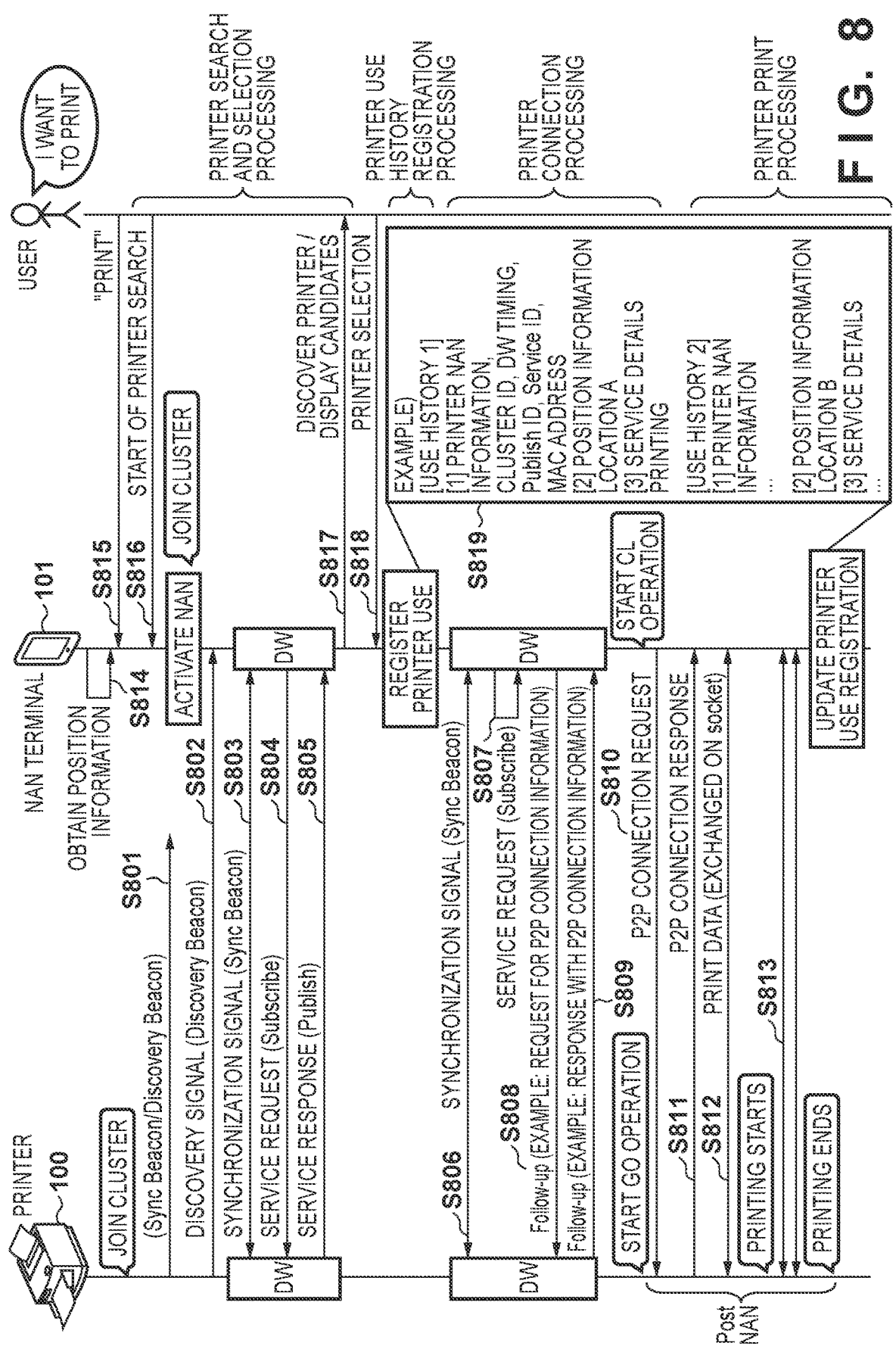
FIG. 8 is a view illustrating an example of a flow of processing for a printer 100, the NAN terminal 101, and a user who operates the NAN terminal 101.

Next, using FIG. 8 to FIG. 12, description is given for a processing flow for the printer 100 of the present embodiment, the NAN terminal 101, and a user that operates the NAN terminal. Firstly, using FIG. 9 to FIG. 12, description is given for a processing flow in accordance with the NAN terminal 101, and next FIG. 8 is used to describe a flow of processing for the printer 100, the NAN terminal 101, and a user who operates the NAN terminal 101.

Figure 9:
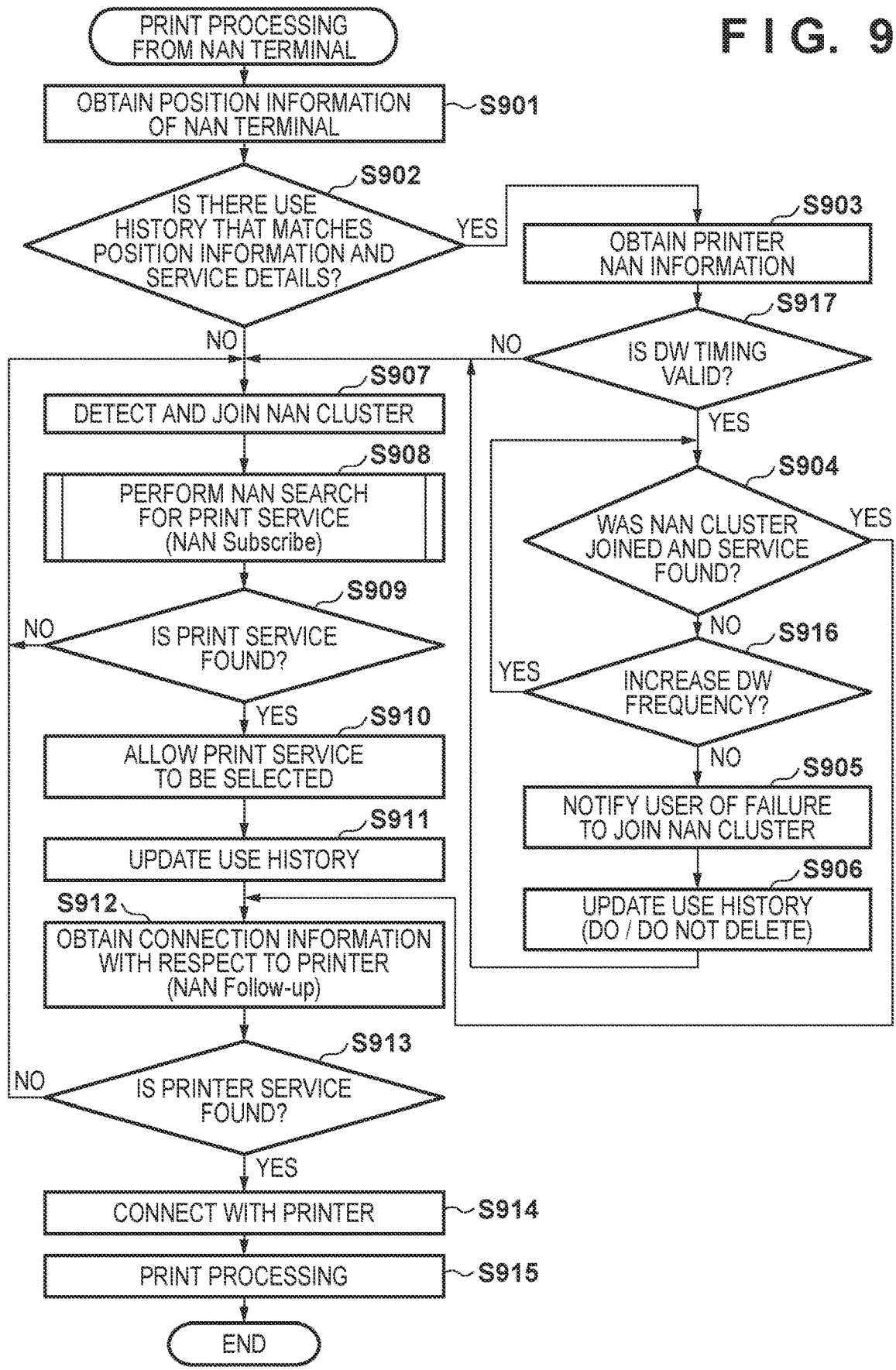
FIG. 9 is a view illustrating an example of a flow of print processing from the NAN terminal 101.

FIG. 9 is a view illustrating an example of a flow of print processing from the NAN terminal 101. The flowchart illustrated by FIG. 9 can be realized by the CPU 402 of the NAN terminal 101 executing a control program stored in the ROM 403, and executing calculations and processing of information and control of various hardware. Note that it is assumed that the NAN terminal 101 already stores service use history information described later in the non-volatile memory 412.

The NAN terminal 101 obtains position information of the NAN terminal 101 itself at a time of using a desired service (step S901). The NAN terminal 101 can obtain position information (GPS information) by the GPS unit 409. In addition, instead of GPS information, the NAN terminal 101 may use position information regarding a base station (an AP), Wi-Fi position information (communication information with respect to an access point) or the like as position information. Next, receiving a request for a print service from a user, the NAN terminal 101 determines whether, in the service use history information saved in the non-volatile memory 412, there is a use history that matches the details (print service here) of the service requested from the user and the position information obtained in step S901 (step S902). The matching of the position information may be holding a certain range, and the range may be separately set by a user.

Here, with reference to FIG. 11, description is given regarding service use history information. FIG. 11 is a view illustrating an example of service use history information. The NAN terminal 101 can generate service use history information as illustrated in FIG. 11 and save it in the non-volatile memory 412, and, by the processing of the CPU 402, the NAN terminal 101 is capable of management such as reading or search processing on a respective item. Note that the service use history information may be saved in an external unit of the NAN terminal 101. In the present embodiment, the service use history information can register a plurality of use histories, which are configured by each item of printer NAN information 1101, by position information 1102, and by service details 1103. Here, the printer NAN information 1101 is information necessary to join a NAN cluster and search for a service provision apparatus (the printer 100). In addition, the position information 1102 is position information of the service search apparatus (the NAN terminal 101). In addition, the service details 1103 are details of a service used by a user.

A date and time is registered in the use history. In addition, a NAN cluster ID inside Discovery Beacon packet information for a time of a cluster search, and a DW timing calculated (derived) from a time of reception of a Sync Beacon packet are registered. The DW timing is a relative time in a clock cycle of the NAN terminal 101 when the NAN Sync Beacon is received, but there is no limitation to this. In addition, a Publish ID, a Service ID, a MAC address, and Service Info are obtained from a Publish packet at a time of a service search in a cluster and registered. In addition, the position information 1102 such as the latitude, longitude, and altitude of the NAN terminal 101 at the time of service usage, and the service details 1103 such as "print" are registered. Note that a registered item may be added in accordance with an intended use.

The description of FIG. 9 is returned to. If the position information obtained in step S901 and a use history that matches the service details requested from the user are present in the service use history information (Yes in step S902), the processing proceeds to step S903. In step S903, the NAN terminal 101 obtains the printer NAN information 1101 included in the use history that matches (step S903). Subsequently, the NAN terminal 101 determines the validity of a DW timing inside the obtained printer NAN information (whether the DW timing satisfies a temporal condition) (step S917). For example, the NAN terminal 101 determines whether the DW timing (a value) is less than or equal to a predetermined time (value). The significance of this processing is described. To learn the DW timing (FIG. 11), the NAN terminal 101 needs to continue a time count (timekeeping) by the timer unit 418, and this is a reason for power consumption. Accordingly, to suppress power consumption, the NAN terminal 101 determines the DW timing to be valid until a predetermined time. The NAN terminal 101 may hold the DW timing until the predetermined time, and subsequently set the DW timing as incorrect and start from a NAN cluster search.

If the DW timing is valid (Yes in step S917), the NAN terminal 101 uses the printer NAN information 1101 obtained in step S903 to attempt to join the NAN cluster that it joined before, and search for the desired service (step S904). In other words, the NAN terminal 101 starts a search for a desired service, omitting NAN cluster search processing (cluster detection processing) for waiting for reception of a Discovery Beacon, and then transmitting and receiving Sync Beacons. Specifically, the NAN terminal 101 uses the DW timing included in the printer NAN information 1101 obtained in step S903 to calculate (derive) the next DW time period (a DW time period in which to attempt to join the cluster), and, in this next DW time period, transmits a Sync Beacon and simultaneously attempts to receive a Sync Beacon. With the DW timing of the printer NAN information obtained in step S903 as the previous clock number, the DW time period in which to attempt to join the cluster can be calculated as a DW time period after [(current clock number—previous clock number) mod 512 TU] by the NAN terminal 101, for example (mod represents a remainder). Note that the DW time period in which to attempt to join the cluster can also be calculated (derived) by another method. For example, it can be calculated using relative time with respect to timing information transmitted from an access point in the vicinity such as the access point 104. Specifically, the NAN terminal 101 can calculate the DW time period in which to attempt to join the cluster by using time information in accordance with a TSF (Timing Synchronization Function) included in a Beacon transmitted from the access point 104.

In step S904, if the NAN terminal 101 was able to join the NAN cluster (Yes in step S904), it is determined that the previously used printer (assumed to be the printer 100) is in the cluster that the NAN terminal 101 joins here (the desired service was found), and the processing proceeds to step S912. In step S912, the NAN terminal 101 requests information for a P2P connection with the printer, and obtains the P2P connection information. In other words, a NAN Follow-up is executed. Next, the NAN terminal 101 determines whether the printer (the printer 100) of the desired service has been found (step S913), and if found the processing proceeds to step S914, connection to make a P2P connection with the printer 100 is performed (step S914), print processing is performed (step S915), and then this processing ends.

In contrast, if the NAN terminal 101 does not find the NAN cluster in step S904 (fails to synchronize with the DW time period) and failed to join the NAN cluster (No in step S904), an attempt to join the NAN cluster may be made again by increasing the frequency of the DW time period (step S916). This is because there is a trend for NAN devices to reduce the frequency of DW time periods for communication with the intention of saving power. If there was a failure to join the NAN cluster (No in step S904 and No in step S916), the processing proceeds to step S905. In step S905, the NAN terminal 101, in accordance with control of the display control unit 410, displays a message such as "did not find previous print service" on the display unit 202, and notifies a user of failure to join the NAN cluster. Note that this notification may be something via the speaker unit 414. Next, in accordance with an operation by a user, for example, the NAN terminal 101 makes an update regarding the detail that there was a failure in a printer search with respect to saved service use history information (step S906). For example, upon receiving the notification of step S905, a user determines whether or not to delete the use history detected in step S902 from the service use history information, and details of the service use history information are updated by an operation in accordance with the decision. Subsequently, the processing proceeds to step S907.

The processing proceeds to step S907 after the processing of step S906 and in the case of No in step S902. In step S907, the NAN terminal 101 receives a Discovery Beacon, and transmits and receives Sync Beacons to thereby search for a NAN cluster and join a recognized NAN cluster. In step S908, the NAN terminal 101 performs a NAN search (NAN Subscribe) for a print service which is the desired service. Specifically, the NAN terminal 101 transmits a Subscribe message to perform a NAN search for the desired service, and, upon receiving a Publish message which is a response to the Subscribe message, generates a print service search result based on the Publish signal. The print service search result is information that associates a TA 701 (a MAC address) included in the Publish message, and details of a NAN Attribute 702 received from the TA 701. A print service search result in the present embodiment is assumed to be configured by the TA 701 (a MAC address), and Service Info (service information) inside the NAN Attribute 702. The processing of step S908 is described later using FIG. 10.

If a Publish message which is a response to the transmitted Subscribe message is received, the NAN terminal 101 determines that a print service is found (step S909), and the processing proceeds to step S910. In addition, if the NAN terminal 101, even without transmitting a Subscribe message, receives a Publish signal that is actively transmitted from a printer, the NAN terminal 101 determines that a print service has been found. If the NAN terminal 101 cannot receive a Publish message that is a response (No in step S909), the NAN terminal 101 determines that the search for a printer service has failed, and the processing returns to step S907. In step S910, the NAN terminal 101 displays a screen for accepting a printer service selection operation on the display unit 202, and allows a user to select (decide) a printer.

FIG. 12 is a view that illustrates an example of a screen, which the NAN terminal 101 displayed on the display unit 202 in step S910, for accepting a printer service selection operation. In FIG. 12, display items are the TA 701 (MAC address) and the Service Info (service information) in the NAN Attribute 702 that are included in the print service search result generated at the time of the NAN search for a print service in step S908. In the present example, two print services neighboring a user holding the NAN terminal 101 have been found, and there is a display that enables a user to choose one of them. For example, a hatched display portion in this view (MAC address: 50-6F-9A-01-00-01, service information: office A 5th floor printer) can be selected by a user via the operation unit 203.

Returning to FIG. 9, after step S910, in step S911, the NAN terminal 101 updates the service use history information. In other words, the NAN terminal 101 performs a new registration of a use history configured by the printer NAN information 1101, the position information 1102, and the service details 1103 in the service use history information (FIG. 11), or performs a necessary correction if this is a history that is already registered. Whether or not there is a history that is already registered can be determined by whether there is a match with a MAC address or Service Info.

After step S911, the processing proceeds to step S912, and processing for after step S912 is as described above. Note that, in the present embodiment, it is assumed that the response of the Follow-up signal of step S912, in other words information for connecting by Post NAN with the service provision apparatus that provides the desired service, is not saved in the service use history information (FIG. 11). This is because this information may sometimes change as appropriate when there are cases where a P2P connection should be made and cases where a connection via an AP should be made, in accordance with the state of printer settings.

Figure 10:
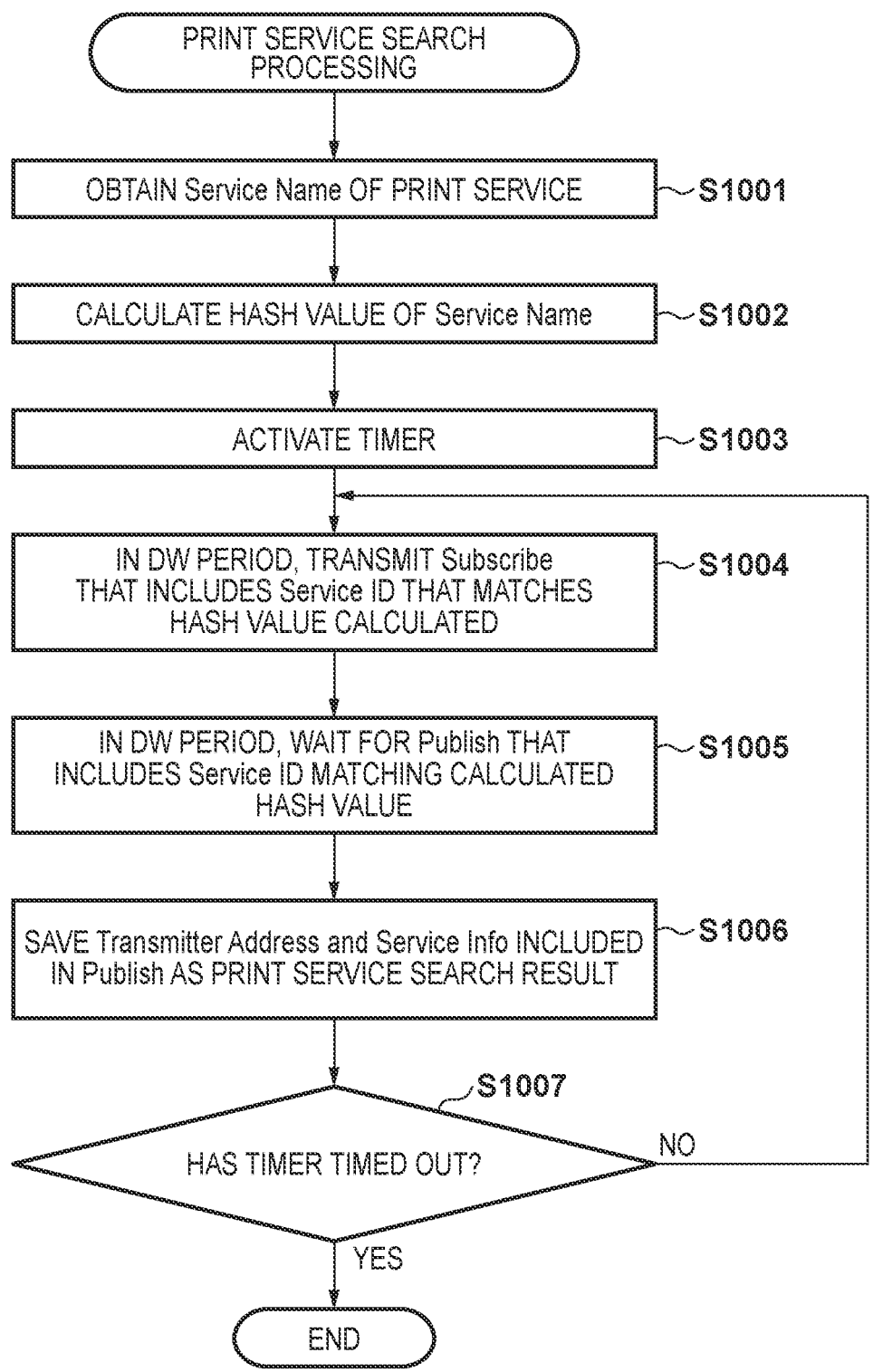
FIG. 10 is a view illustrating an example of a flow of processing for performing a NAN search for a print service.

Next, with reference to FIG. 10, description is given regarding the processing of step S908 of FIG. 9. FIG. 10 is a view illustrating an example of a flow of processing for the NAN terminal 101 to perform a NAN search for a print service. Firstly, the NAN terminal 101 obtains the Service Name of the print service via an operation by a user or from a memory (the RAM 404 or the non-volatile memory 412) (step S1001). The Service Name is a character sequence representing a print service in the NAN standard. In a case of obtaining the Service Name of the print service via an operation by a user, the Service Name of the print service may be obtained by converting information inputted by the user. The Service Name of a printer service may be "print service", for example, but another character sequence may be used. In addition, a character sequence that includes a domain name such as "org.organization xyz.print service" may be used, for example. Next, the NAN terminal 101 calculates a hash value for the Service Name obtained in step S1001 (step S1002). For example, the NAN terminal 101 can take the character sequence (the Service Name) as an input to the hash function SHA-256, and take the first 48 bits (6 bytes) of an output result of this hash function as a hash value. In addition, the hash value may be calculated by another calculation method. In addition, depending on the situation, a predetermined value that corresponds to the character sequence but is not a hash value, such as the character sequence itself, may be used. Next, the NAN terminal 101 activates the timer unit 418 (step S1003), and repeatedly executes processing of the following step S1004 to step S1007 during a predetermined time period. The predetermined time period is 10 seconds for example, but there is no limitation to this, and any length of time can be used as the predetermined time period.

In step S1004, the NAN terminal 101 transmits a subscribe message in a DW time period (step S1004). For the Subscribe message here, information specifying that this is a Subscribe message to Service Control is set, and transmission is performed by an SDF that includes a Service ID matching the hash value calculated and obtained in step S1002. Next, in the DW time period, the NAN terminal 101 waits for reception of a Publish message that includes a Service ID matching the previously described hash value (step S1005). For example, if the NAN terminal 101 has a function for filtering based on Service ID, this function is used to block Publish messages that do not have the hash value described above set to the Service ID. Upon receiving a Publish message whose Service ID matches, the NAN terminal 101 determines whether the apparatus that is the transmission source of the Publish message is a printer that is providing a print service. The NAN terminal 101 associates, as a print service search result, a TA 701 (a MAC address) included in the Publish message, and Service Info inside the NAN Attribute 702 received from the TA 701, and causes the result to be stored in the RAM 404 or the non-volatile memory 412 (step S1006). After the processing of step S1004 to step S1007 is executed during the predetermined time, the processing of FIG. 10 ends.

Next, with reference to FIG. 8, description is given for a flow of processing between the printer 100, the NAN terminal 101, and a user who operates the NAN terminal 101. FIG. 8 is a sequence diagram between for the printer 100, the NAN terminal 101, and a user who operates the NAN terminal 101.

Firstly, description is given regarding operation of the printer 100. In the present example, in addition to NAN operation, the printer 100 can execute processing corresponding to a plurality of print services via wireless LAN, and is capable of print processing in which print data is received via P2P or an AP. In addition, it is assumed that the printer 100 operates as Master of the NAN cluster 110. The printer 100, which is operating as Master, transmits a synchronization signal and a discovery signal (a Sync Beacon and a Discovery Beacon) (step S801 and step S802). When the printer 100 receives a synchronization signal (a Sync Beacon) from the NAN terminal 101 in the next DW time period (step S803), a schedule for DW time periods is synchronized between the printer 100 and the NAN terminal. Next, the printer 100 receives a service request (Subscribe) from the NAN terminal 101 (step S804), and transmits a service response (Publish) as a response thereto (step S805).

If the printer 100, after receiving a synchronization signal (a Sync Beacon) from the NAN terminal 101 in the next DW time period (step S806), receives a Follow-up request (step S808), the printer 100 transmits a Follow-up response as a response thereto (step S809). This Follow-up response can include information for a P2P connection or information for connection via an AP, in accordance with a printer state. The printer 100 can transmit the service response (Publish) or the Follow-up response in the next or a subsequent DW time period if the service response (Publish) or the Follow-up response cannot be transmitted in the current DW time period.

Next, description is given regarding operation of the NAN terminal 101 and operation by a user. The NAN terminal 101 obtains position information of itself by the GPS unit 409 (step S814). As described above, a method of obtaining position information is not limited to GPS. Next, the user requests the NAN terminal 101 to use a print service (step S815), and instructs it to start a printer search (step S816). Receiving the instruction to start a printer search, the NAN terminal 101 activates NAN, performs a NAN search, receives the Discovery Beacon (step S802), and joins the NAN cluster 110 (step S907 of FIG. 9). Next, the NAN terminal 101 transmits a service request (Subscribe) during a DW time period (step S804), and receives a service response (Publish) as a response thereto (step S805). Printers found are displayed on the display unit 202 of the NAN terminal 101 (step S817), and a user is allowed to make a selection (step S818). After selection of a printer by the user, the NAN terminal 101 registers a use history of the printer to printer use history information (step S819, and step S911 of FIG. 9). Next, the NAN terminal 101 joins the cluster 110 of the selected printer 100, enters a service request (Subscribe) state in NAN (step S807), transmits the Follow-up signal (step S808), and receives the response thereto (step S809). However, in the case of a state where a service request (Subscribe) by NAN is already outputted, the processing of step S807 is skipped. After a printer could be correctly found, to perform printing for a user request, the NAN terminal 101, by a P2P connection (step S810), transmits print data to the printer 100 (step S812 and step S813), and causes print processing to complete. Subsequently the service (printing) is added to service use history information (step S819).

By virtue of the present embodiment with such a configuration, in a case of using a service of the same device inside a similar NAN cluster as previous, NAN cluster search processing (cluster detection processing) is omitted, or, in a new environment, normal NAN cluster search processing is performed. By this, by eliminating redundant processing in processing for use of a service desired by a user, processing of a response for a user gets faster, and usability improves.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-111244, filed Jun. 11, 2018, which is hereby incorporated by reference herein in its entirety.

What is claimed is:

1. A communication apparatus capable of communication with another communication apparatus inside a NAN (Neighbor Awareness Networking) cluster in a network compliant with a NAN standard, comprising:
  one or more processors; and
  one or more memories including instructions that, when executed by the one or more processors, cause the communication apparatus to:
    hold a use history of a service previously used by the communication apparatus, the use history including information on a NAN cluster that was used when the service was previously used;
    in a case where the communication apparatus uses the service, determine whether the use history of the service is being held; and
    (1) if it is determined that the use history of the service is being held, perform, based on the information included in the use history, a search for the service without performing processing to detect a NAN cluster, and, (2) if it is determined that the use history of the service is not being held, perform processing to detect the NAN cluster and perform a search for the service after detecting the NAN cluster.

2. The communication apparatus according to claim 1, wherein the execution of the instructions further causes the communication apparatus to:
  if it is determined that the use history of the service is being held, and if searching for the service was failed, perform the processing to detect a NAN cluster, and, after detecting the NAN cluster, perform the search for the service.

3. The communication apparatus according to claim 1, wherein the execution of the instructions further causes the communication apparatus to:
  if it is determined that the use history of the service is being held, and if searching for the service was failed, notify a user that the service used previously cannot be found.

4. The communication apparatus according to claim 1, wherein the execution of the instructions further causes the communication apparatus to:
  if it is determined that the use history of the service is being held, and if searching for the service was failed, delete the use history of the service.

5. The communication apparatus according to claim 1, wherein the use history includes position information of the communication apparatus when the service was used, and information of a type of the service used.

6. The communication apparatus according to claim 5, wherein the information of the type of the service used is obtained from a received Publish message.

7. The communication apparatus according to claim 5, wherein the determination is further made about whether the use history, which includes the position information of the communication apparatus for a time when the service was used and the information of the type of the service, is being held.

8. The communication apparatus according to claim 5, wherein the use history further includes information of a timing of a Discovery Window (DW) obtained from a Sync Beacon received in the NAN cluster joined in order to use the service.

9. The communication apparatus according to claim 8, wherein the execution of the instructions further causes the communication apparatus to:
  if it is determined that the use history, which includes the position information of the communication apparatus for a time when the service was used and the information of the type of the service, is being held perform a search for the service in a DW time period derived from a timing of the DW.

10. The communication apparatus according to claim 9, wherein a search for the service is performed in one or more other DW time periods in addition to the DW time period derived from the timing of the DW.

11. The communication apparatus according to claim 8, wherein the execution of the instructions further causes the communication apparatus to:
  if it is determined that the use history, which includes the position information of the communication apparatus for a time when the service was used and the information of the type of the service, is being held, and if the timing of the DW does not satisfy a predetermined temporal condition, perform detection for a NAN cluster, and, after detecting the NAN cluster, perform a search for the service.

12. A method of controlling communication apparatus capable of communication with another communication apparatus inside a NAN (Neighbor Awareness Networking) cluster in a network compliant with a NAN standard, the method comprising:
  holding a use history of a service previously used by the communication apparatus, the use history including information on a NAN cluster that was used when the service was previously used;

in a case where the communication apparatus uses the service, determining whether the use history of the service is being held; and (1) if it is determined that the use history of the service is being held, performing based on the information included in the use history, a search for the service without performing processing to detect the NAN cluster, and, (2) if it is determined that a use history of the service is not being held, performing processing to detect the NAN cluster and performing a search for the service after detecting the NAN cluster.

13. A non-transitory computer readable storage medium storing a computer program for controlling a computer to execute a method of controlling communication apparatus capable of communication with another communication apparatus inside a NAN (Neighbor Awareness Networking) cluster in a network compliant with a NAN standard, the method comprising:

holding a use history of a service previously used by the communication apparatus, the use history including information on a NAN cluster that was used when the service was previously used;

in a case where the communication apparatus uses the service, determining whether the use history of the service is being held; and (1) if it is determined that the use history of the service is being held, performing, based on the information included in the use history, a search for the service without performing processing to detect a NAN cluster, and, (2) if it is determined that the use history of the service is not being held, performing processing to detect the NAN cluster and performing a search for the service after detecting the NAN cluster.

* * * * *